United States Patent
Nylund et al.

(12)

(10) Patent No.: US 6,229,868 B1
(45) Date of Patent: May 8, 2001

(54) NUCLEAR FUEL ASSEMBLY

(75) Inventors: Olov Nylund; Thorbjörn Sahlin, both of Västerås (SE)

(73) Assignee: ABB Atom AB, Vasteras (SE)

( * ) Notice: Subject to any disclaimer, the term of this patent is extended or adjusted under 35 U.S.C. 154(b) by 0 days.

(21) Appl. No.: 09/202,689

(22) PCT Filed: Jun. 18, 1997

(86) PCT No.: PCT/SE97/01082

§ 371 Date: Feb. 10, 1999

§ 102(e) Date: Feb. 10, 1999

(87) PCT Pub. No.: WO97/49098

PCT Pub. Date: Dec. 24, 1997

(30) Foreign Application Priority Data

Jun. 20, 1996 (SE) .................................... 9602453

(51) Int. Cl.$^7$ ...................................... G21C 3/00
(52) U.S. Cl. ................. 376/433; 376/434; 376/443; 376/462; 376/352; 376/448
(58) Field of Search ..................... 376/443, 462, 376/352, 430, 434, 433

(56) References Cited

U.S. PATENT DOCUMENTS

| | | | |
|---|---|---|---|
| 3,287,230 | * 11/1966 | Jenkins et al. | 176/77 |
| 4,326,922 | * 4/1982 | Ferrari et al. | 376/435 |
| 4,716,015 | * 12/1987 | Carlson | 376/445 |
| 4,994,234 | * 2/1991 | Nylund | 376/445 |
| 5,009,837 | * 4/1991 | Nguyen et al. | 376/261 |
| 5,219,517 | * 6/1993 | Nylund | 376/352 |
| 5,249,210 | * 9/1993 | Nylund et al. | 376/352 |
| 5,345,483 | * 9/1994 | Johansson et al. | 376/313 |
| 5,361,287 | * 11/1994 | Williamson | 376/352 |
| 5,778,035 | * 7/1998 | Nylund | 376/361 |
| 5,867,551 | * 2/1999 | Toshihiko | 376/352 |

FOREIGN PATENT DOCUMENTS

| | | | |
|---|---|---|---|
| 2204168 | * 8/1973 | (DE) . | |
| 2557910 | * 7/1976 | (DE) . | |
| 329985 | * 8/1989 | (EP) . | |
| 425856 | * 8/1991 | (EP) . | |
| 2500947 | * 9/1982 | (FR) | 376/443 |
| 1248737 | * 10/1971 | (GB) . | |
| 1403491 | 8/1975 | (GB) . | |
| 11-118969 | * 4/1999 | (JP) . | |
| 460 452 | 10/1989 | (SE) . | |
| 503 441 | 6/1996 | (SE) . | |
| 510 816 | 6/1999 | (SE) . | |
| 96/20483 | * 7/1996 | (WO) . | |

OTHER PUBLICATIONS

Cirimello, R.O., et al., "Recent Developments in Power Reactor Fuel in Argentina," *Improvements in Water Reactor Fuel Technology and Utilization*, Proceedings of a Symposium, Stockholm, Sep. 15–19, 1986, International Atomic Energy Agency, Vienna, 1987, pp. 207–217.

* cited by examiner

*Primary Examiner*—Charles T. Jordan
*Assistant Examiner*—Jack Keith
(74) *Attorney, Agent, or Firm*—Connolly, Bove, Lodge & Hutz

(57) ABSTRACT

The present invention relates to a fuel assembly for a light-water nuclear reactor with a substantially square cross section which comprises fuel rods (4) extending between a bottom tie plate (16) and a top tie plate (17). A coolant is adapted, during operation, to flow upwards through the fuel assembly. According to one aspect of the invention, the fuel assembly comprises a plurality of fuel units (3) stacked on top of each other, wherein each fuel unit (3) comprises a plurality of fuel rods (4) extending between a top tie plate (17) and a bottom tie plate (16). The fuel units are arranged attached to a support structure (4a, 14, 14a, 14b) extending through the whole fuel assembly such that axial gaps are formed between the fuel units (3). One of the tie plates is freely movable relative to the support structure.

8 Claims, 6 Drawing Sheets

NUCLEAR FUEL ASSEMBLY

TECHNICAL FIELD

The present invention relates to a nuclear fuel assembly with a substantially square cross section for a light water reactor comprising fuel rods extending between a top tie plate and a bottom tie plate.

BACKGROUND ART

In a nuclear reactor, moderated by means of light water, the fuel exists in the form of fuel rods, each of which contains a stack of pellets of a nuclear fuel arranged in a cladding tube, a column of extruded fuel cylinders of an uninterrupted column of vibration-compacted powdered fuel. The cladding tube is normally made of a zirconium-base alloy. A fuel bundle comprises a plurality of fuel rods arranged in parallel with each other in a certain definite, normally symmetrical pattern, a so-called lattice. The fuel rods are retained at the top by a top tie plate and at the bottom by a bottom tie plate. To keep the fuel rods at a distance from each other and prevent them from bending or vibrating when the reactor is in operation, a plurality of spacers are distributed along the fuel bundle in the longitudinal direction. A fuel assembly comprises one or more fuel bundles, each one extending along the main part of the length of the fuel assembly.

Together with a plurality of similar fuel assemblies, a fuel assembly is arranged in a core. The core is immersed in water which serves both as coolant and as neutron moderator. During operation, the water flows from below and upwards through the fuel assembly, whereby, in a light-water reactor of boiling water type, part of the water is transformed into steam. The percentage of steam increased towards the top of the fuel assembly. Consequently, the coolant in the lower part of the fuel assembly consists of water whereas the coolant in the upper part of the fuel assembly consists both of steam and of water. This difference between the upper and lower parts gives rise ot special factors which must be taken into consideration when designing the fuel assembly.

It is therefore desirable to achieve a flexible fuel assembly for a boiling water reactor which, in a simple manner, may be given a shape in which the upper part of the fuel assembly differs from the lower part thereof. A fuel assembly for a boiling water reactor with these properties is shown in PCT/SE95/01478 (Int. Publ. No. WO 96/20483). This fuel assembly comprises a plurality of fuel units stacked on top of each other, each comprising a plurality of fuel rods extending between a top tie plate and a bottom tie plate. The fuel units are surrounded by a common fuel channel with a substantially square cross section. A fuel assembly of this type may in a simple manner be given a different design in its upper and lower parts.

As in a light-water reactor of boiling water type, the water flows during operation from below and up through the fuel assembly of pressurized-water type. The temperature of the water increases the higher it rises in the assembly but it does not boil. A consequence of this is that corrosion of the cladding tubes increase sin the upper part as compared with the lower part of the fuel assembly. This difference between the upper and lower parts gives rise to special factors which must be taken into consideration when designing the fuel assembly.

It is therefore desirable, in the same way as has been described for a boiling water reactor, to achieve a flexible fuel assembly for a pressurized-water reactor which, in a simple manner, may be given a design in which the upper part of the fuel assembly differs from the lower part thereof. In UK 1 403 491, a fuel assembly for a pressurized-water reactor is shown, with a possibility of designing the upper part such that is differs from the lower part. This fuel assembly comprises a plurality of fuel units stacked on top of each other, each of which comprises a plurality of fuel rods extending between a top tie plate and a bottom tie plate. The fuel units are fixed to a centrally arranged support tube such that the bottom tie plate of one of the fuel units rests on the top tie plate of an adjacently arranged fuel unit and such that all the fuel rods in the fuel units are parallel to each other. The support tube extends through the whole fuel assembly and the fuel assembly has a substantially circular cross section. This fuel assembly is intended to be used in a nuclear reactor moderated by heavy water where the fuel assemblies are arranged in vertical pressure channels.

Another fuel assembly for a pressurized-water reactor with short fuel units with a hexagonal cross section is shown in "Improvements in Water Reactor Fuel Technology, Proceedings of a Symposium Stockholm, 15–19 September 1986, International Atomic Energy Agency, Vienna, 1987". The fuel units are shown vertically arranged and stacked to top of each other.

One factor which must be taken into consideration when designing a fuel assembly of light-water type is that the fuel rods grow to varying degrees during operation. The fuel assembly must therefore comprise members so as to allow this growth.

Another factor which must be taken into consideration is that the enthalpy across the core becomes as uniform as possible. For achieving enthalpy equalization across the core, it is known to provide fuel assemblies with a burnup-dependent flow resistance. In SE 460 452, elongated elements, such as fuel rods, are provided at their lower ends with restriction bodies which, when the elongated elements during irradiation are gradually, during the burnup of the fuel assembly, adapted to more and more restrict the flow of the coolant through an opening arranged below the restriction body by moving the restriction body closer and closer to this opening. In SE 9003330-9, the spacers are provided with members which are automatically, or manually, gradually activated during the burnup of the fuel assembly such that the coolant flow is deflected to one or more adjoining fuel assemblies.

The object of the present invention is to provide a fuel assembly for a light-water reactor comprising a plurality of short fuel units and members for differential growth of the fuel rods in the fuel units. Another object of the invention is to suggest a fuel assembly with a burnup-dependent flow resistance.

SUMMARY OF THE INVENTION

The present invention relates to a fuel assembly of substantially square cross section for a light-water reactor comprising a fuel assembly with a plurality of fuel rods extending between a top tie plate and a bottom tie plate.

The fuel assembly comprises a plurality of fuel units, each comprising a plurality of fuel rods extending between a bottom tie plate and a top tie plate. The bottom and top tie plates may be designed identical. According to one aspect of the invention, the bottom tie plates are fixed to at least one of the water channels (boiling water reactor) or control rod guide tubes (pressurized-water reactor) extending through the fuel assembly, whereas the top tie plates are arranged freely movable in relation thereto. By this embodiment, an axial gap may be obtained between two adjacently located top and bottom tie plates. This axial gap may be utilized as means for accumulation of differential growth of the fuel rods such that the outer dimensions of the fuel assembly are not influenced. Alternately, the top tie plate may be attached to the water channels and the control rod guide tubes, respectively, and the bottom tie plate be freely movable in relation thereto.

The fixation of the bottom tie plate and the top tie plate, respectively, to the water channels and the control rod guide tubes, respectively, may be permanent or detachable. A permanent fixation may, for example, be achieved by bulging the respective water channel and control rod guide tube when these are inserted into the bottom tie plate and the top tie plate, respectively. A detachable fixation may, for example, be achieved by arranging a bayonet coupling between the respective water channel and control rod guide tube and the bottom tie plate and the top tie plate, respectively.

When designing fuel assemblies for an existing pressurized-water reactor, the length of the fuel units is determined by the distance between the existing spacers. This is because in a pressurized-water reactor the spacers are adapted to rest against the spacers at the same level in adjacently located fuel assemblies. The fuel units are formed with top and bottom tie plates with a supporting function corresponding to that of the replace spacer. To avoid the risk of bending of the rod or vibration, it may be suitable in certain cases to arrange spacers also in a fuel unit. Alternatively, two fuel units may be arranged between two existing spacer levels. This design provides a very stiff construction since a fuel unit will then only have a length of the order of size of typically 250 millimeters.

According to one aspect of the invention, a burnup-dependent flow resistance is achieved in the above-mentioned axial gaps between two adjacently located top and bottom tie plates. This is achieved with the aid of flow tongues arranged in flow openings which, in turn, are arranged in the top and bottom tie plates. The flow openings of the top and bottom tie plates are in the fuel assembly arranged one above the other with coinciding centre axes. The flow tongues are arrange such that the flow tongues in a bottom tie plate are arranged across spaces between the flow tongues in a top tie plate arranged adjacent the bottom tie plate. In a new fuel assembly where, for example, the bottom tie plate is arranged fixed to a control rod guide tube such that an axial gap is formed between two adjacently located top and bottom tie plates, this embodiment provides a low flow resistance. After a certain time of burnup of the fuel assembly and a growth of the fuel rods associated therewith, which grow more than the control rod guide tubes, the distance between the adjacently located top and bottom tie plates is reduced, whereby the flow tongues cause the flow resistance to increase to a corresponding extent.

In an alternative embodiment of the invention, a burnup-dependent flow resistance is achieved by providing adjacently arranged top and bottom tie plates with flow openings with centre axes displaced in relation to each other. In a partially burnt-up fuel assembly, the flow resistance is greater because the distance between two adjacently arranged top and bottom tie plates has been reduced as a result of the growth of the fuel rods due to neutron irradiation during operation. By displacing the centre axes of the flow openings in a diagonal direction, an advantageous mixing of the coolant may be achieved within and between fuel assemblies. Alternatively, the centre axes of the flow openings may be displaced such that a mixing in the clockwise or counterclockwise direction is obtained substantially within one and the same fuel assembly. An advantage of this mixing is that an equalization of the temperature of the coolant and a reduction of its maximum temperature are obtained in the relevant mixing cross section. Such a mixing is described in greater detail in SE 9402074-0.

Especially in fuel assemblies with a burnup-dependent flow limitation it may be advantageous to arrange spacers, according to the above, in the short fuel units. The burnup-dependent flow limitation may give rise to vibration due to transverse flows formed.

The advantage of the fuel assembly according to the invention is that axial gaps may be achieved between the fuel units such that a differential growth of the fuel rods may accumulate in this region.

Another advantage of the fuel assembly according to the invention is that the flow conditions of the coolant may be influenced by the fuel rods having a greater growth than the control rod guide tubes and the water channels during the life cycle of the fuel assembly. By arranging restriction means in the axial gaps between the fuel units, a burnup-dependent flow resistance may be achieved successively through the fuel assembly gradually in dependence on the burnup.

The suspension of the fuel units onto a support structure, such as control rod guide tubes or water channels, implies that the mechanical strength requirements on the fuel units are reduced.

BRIEF DESCRIPTION OF THE DRAWINGS

FIG. 6b shows in a view from above a flow opening in a bottom tie plate with a center axis which is displaced in relation to the center axis of the flow opening shown in FIG. 6a.

DESCRIPTION OF THE PREFERRED EMBODIMENTS

Figure 1:
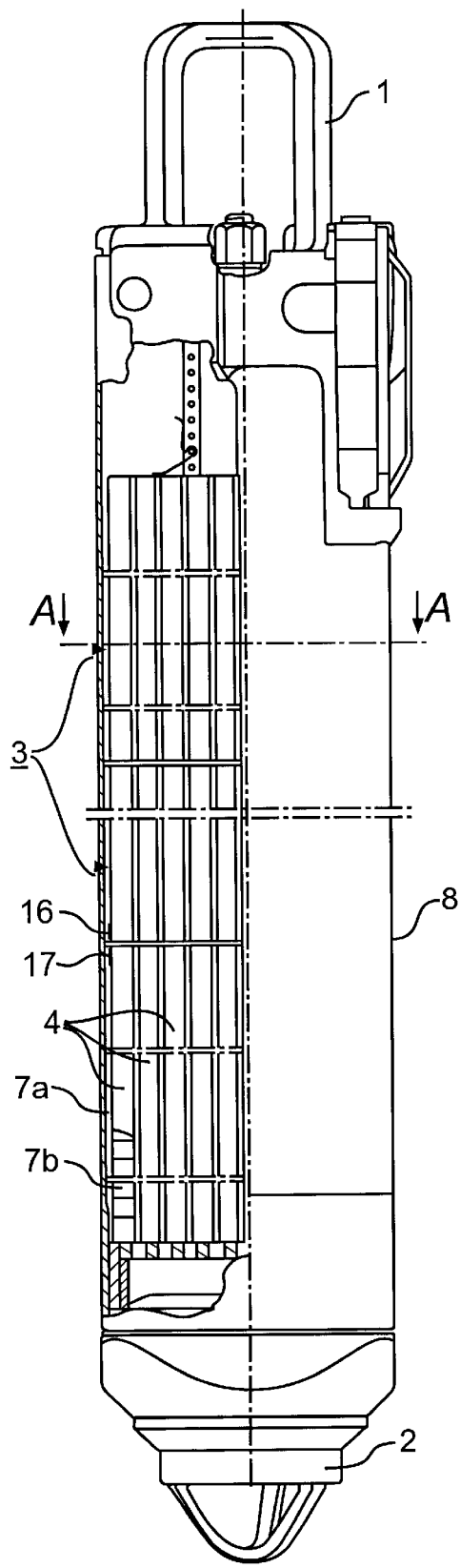
FIG. 1a shows in a vertical section a fuel assembly of a boiling water type with short fuel units.

FIG. 1 shows a fuel assembly of a boiling water type comprising an upper handle 1, a lower end portion 2 and a plurality of fuel units 3 stacked one above the other. Each fuel unit 3 comprises a plurality of fuel rods 4 arranged in parallel and in spaced relationship to each other in a given lattice. Further, each fuel unit 3 comprises a top tie plate 16 and a bottom tie plate 17 for attachment of the fuel rods 4 in their respective positions in the lattice. The fuel units 3 are stacked on top of each other in the longitudinal direction of the fuel assembly and they are stacked in such a way that the top tie plate 17 in one fuel unit 3 is facing the bottom tie plate 16 in the next fuel unit 3 in the stack and such that the fuel rods 4 in all the fuel units 3 are parallel to one another. A fuel rod 4 contains fuel in the form of a stack of fuel pellets 7b of uranium arranged in a cladding tube 7a. A coolant is adapted to flow from below and up through the fuel assembly.

Figure 2:
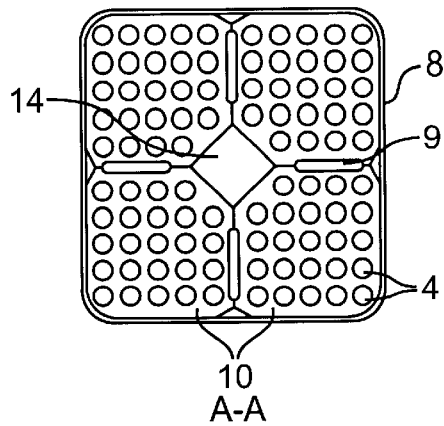
FIG. 2 shows a section A—A of the fuel assembly in FIG. 1.

FIG. 2 shows that the fuel assembly is enclosed in a fuel channel 8 with a substantially square cross section. The fuel channel 8 is provided with a hollow support member 9 of cruciform cross section, which is secured to the four walls of the fuel channel 8. In the central channel 14 formed of the support member 9, moderator water flows. The fuel channel 8 surrounds four vertical channel-formed parts 10, so-called sub-channels, with an at least substantially square cross section. The four sub-channels each comprises a stack of fuel units 3. Each fuel unit 3 comprises 24 fuel rods 4 arranged in a symmetrical 5×5 lattice. The fuel units 3 are kept in position by being fitted onto and fixed to the water channel 14 which surrounds the vertical channel.

The fuel assembly in FIG. 2 comprises 10×10 fuel rod positions. By a fuel rod position is meant a position in the lattice. All the fuel rod positions in the lattice need not be occupied by fuel rods 4. In certain fuel assemblies, a number of fuel rods 4 are replace by one or a plurality of water channels. The introduction of a water channel changes the number of fuel rods 4 but not the number of fuel rod positions.

Figure 2A:
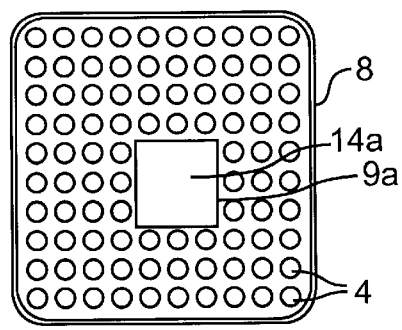
FIGS. 2a and 2b show alternative embodiments in a section A—A of the fuel assembly in FIG. 1.

FIG. 2a shows a fuel assembly which is provided with an internally arranged vertical channel 14a through which water is conducted in a vertical direction from below and upwards through the fuel assembly. The channel 14a is surrounded by a tube 9a with a substantially square cross section. The fuel units 3 are kept in position by being fitted onto the tube which surrounds the vertical channel.

Figure 2B:
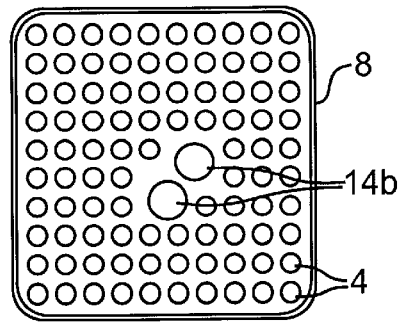

FIG. 2b shows a fuel assembly which is provided with two centrally arranged vertical water rods 14b through which water is conducted from below and upwards through the fuel assembly. The water rods 14b have a diameter which is somewhat larger than the diameter of the fuel rods 4 and are formed with a substantially circular cross section. The fuel units 3 are kept in position by being fitted onto the water rods 14b.

Figure 3:
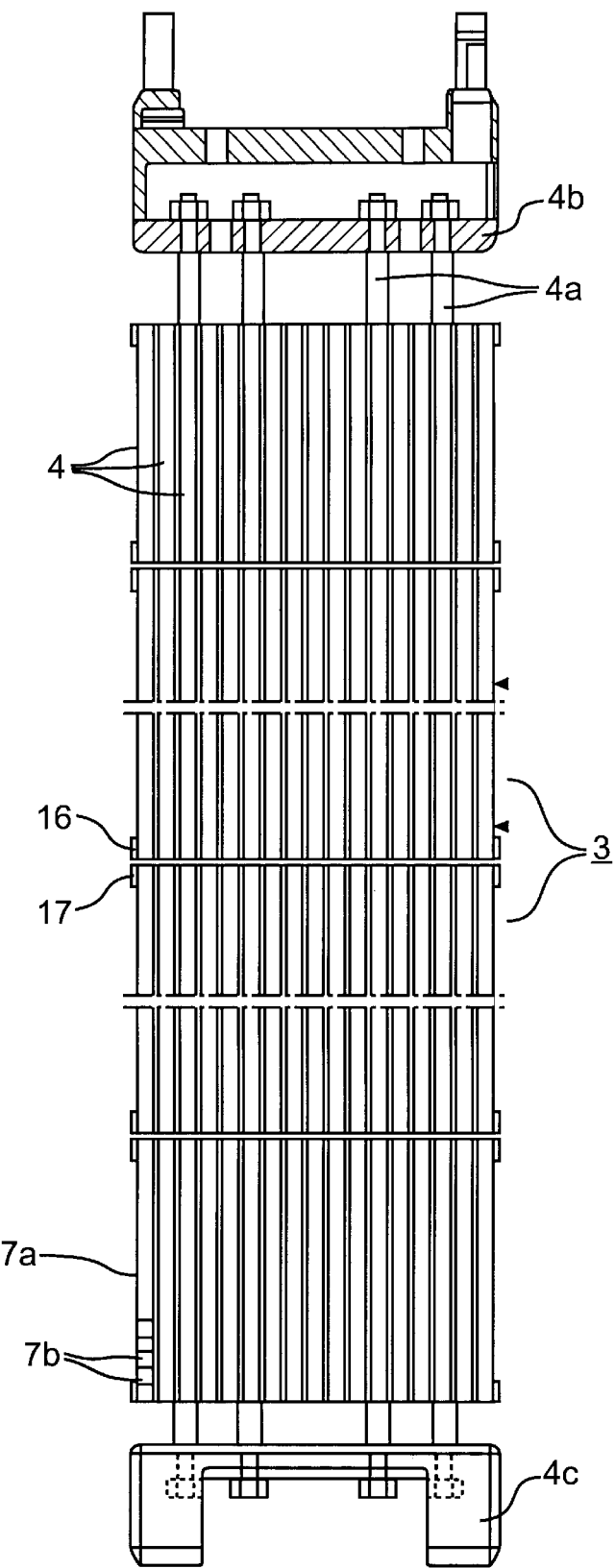
FIG. 3 shows in a vertical section a fuel assembly of pressurized-water type with short fuel units.

FIG. 3 shows a pressurized-water fuel assembly. In the same way as the fuel assembly in FIG. 1, it comprises a plurality of fuel units 3 stacked on top of each other. Each fuel unit 3 comprises a plurality of fuel rods 4 arranged in parallel and in spaced relationship to each other in a given lattice. Each fuel unit 3 further comprises a top tie plate 17 and a bottom tie plate 16 for attachment of the fuel rods 4 in their respective positions in the lattice. The fuel units 3 are stacked on top of each other in the longitudinal direction of fuel assembly and they are stacked in such a way that the top tie plate 17 in one fuel unit 3 is facing the bottom tie plate 16 in the next fuel unit 3 in the stack, and such that the fuel rods 4 in all the fuel units 3 are parallel to each other. A fuel rod 4 contains fissionable material in the form of a stack of fuel pellets 7b of uranium arranged in a cladding tube 7a. A coolant is adapted to flow from below and upwards through the fuel assembly. A number of so-called control rod guide tubes 4a are arranged extending through the whole fuel assembly. The control rod guide tubes 4a are intended to receive finger-shaped control rods (not shown) which are, respectively, inserted into and withdrawn form the guide tubes 4a for the purpose of controlling the power of the nuclear reactor. The guide tubes extend between a top art 4b and a bottom part 4c. The top part 4b is arranged above the uppermost fuel unit 3 in the fuel assembly and the bottom part 4c is arranged below the lowermost fuel unit 3 in the fuel assembly. The fuel units 3 are kept in position by being fitted onto and fixed to the control rod guide tubes 4a.

Figure 4A:
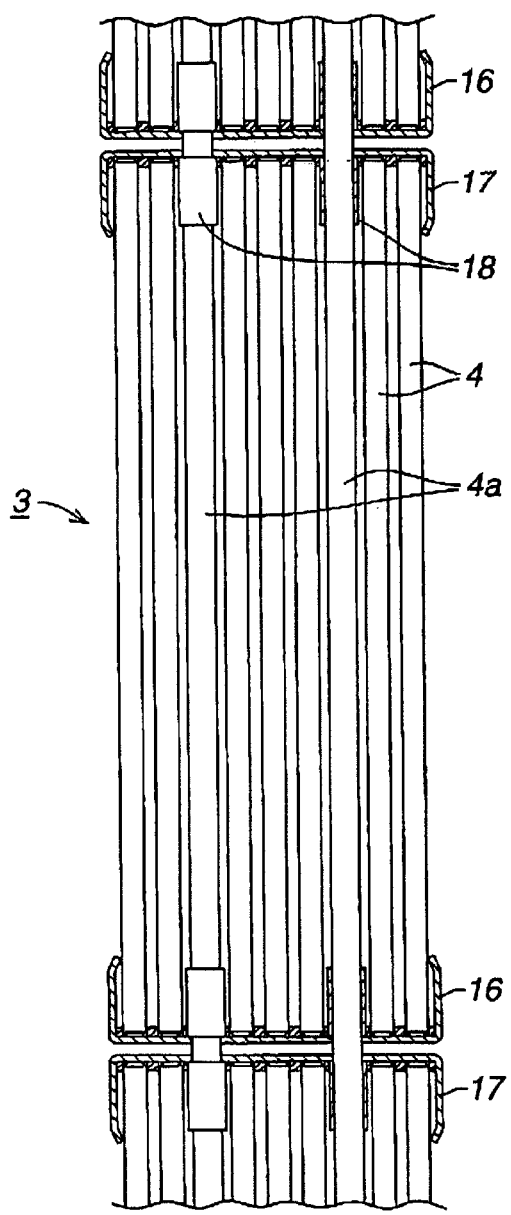
FIG. 4a shows a fuel unit connected to adjacently arranged fuel units via water channels/control rod guide tubes.

FIG. 4a shows a fuel unit 3 for a pressurized-water reactor according to FIG. 3, which is connected at top and bottom to fuel units 3. The fuel units 3 are interconnected by way of the guide tubes 4a extending through the whole fuel assembly. The fuel rods 4 extend between a bottom tie plate 16 and a top tie plate 17. In the bottom tie plate 16 and the top tie plate 17, sleeves 18 are arranged. To the left in FIG. 4a, the sleeves 18 and the guide tubes 4a are shown in a view from the side and to the right in FIG. 4a, the sleeves 18 and the guide tubes 4a are shown in a vertical section. The bottom tie plate 16 is fixed to the guide tube 4a by means of bulging (not shown) of the guide tube 4a when this is inserted into the sleeve 18. The top tie plates 17 are freely movable along the guide tubes 4a. The top tie plates 17 may, of course, be fixed to the guide tube 4a whereas the bottom tie plates 16 are arranged freely movable in relation thereto.

Admittedly, FIG. 4a refers to a fuel assembly for a pressureized-water reactor, but in those cases where a boiling water reactor is intended, the fuel assembly is designed in a corresponding manner but in that case the bottom tie plates 16 and the top tie plates 17 are instead arranged to the water channels 14, 14a, 14b with axial gaps between the fuel units.

Figure 4B:
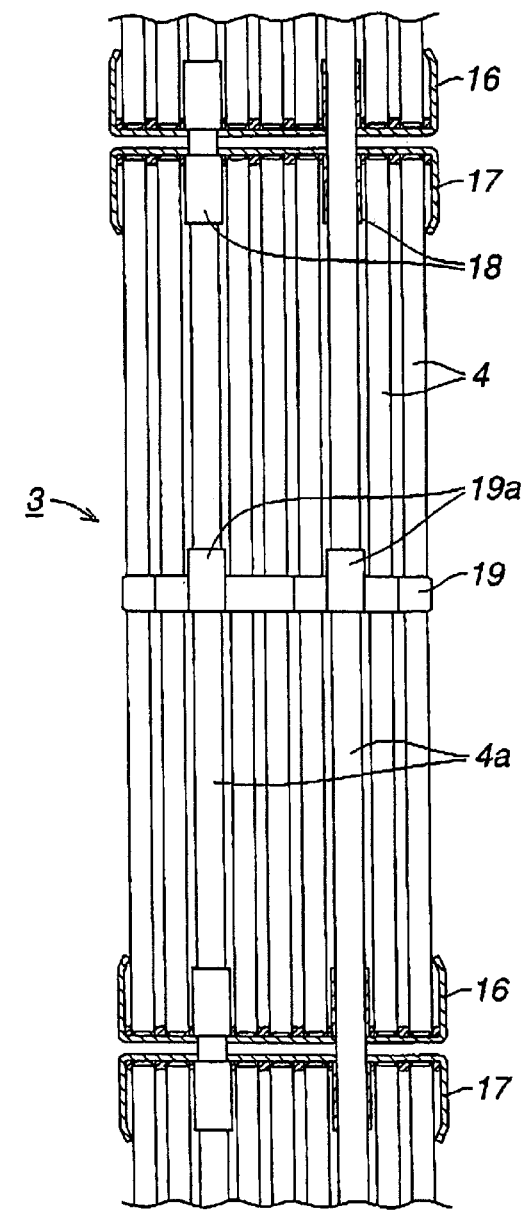
FIG. 4b shows a fuel unit connected to adjacently arranged fuel units via water channels/control rod guide tubes where a spacer is arranged in the fuel unit.

FIG. 4b shows a fuel unit 3 of the same type as in FIG. 4a but with a spacer 19 arranged between the bottom tie plate 16 and the top tie plate 17. In an advantageous embodiment, the spacer 19 is made from sleeve-formed cells with elongated contact surfaces, for example of the type indicated in SE 9303583-0. The sleeves 19a which surround the control rod guide tubes 4a have been given a larger length in the axial direction for increased mechanical guiding of the control rod guide tubes. The sleeves in the sleeve spacer 19 may possibly be provided with conventional mixing vanes for mixing the coolant flowing upwards through the fuel assembly.

The top tie plate 17 and the bottom tie plate 16 are provided with a plurality of flow openings 20 intended to be traversed by the coolant flowing upwards in the fuel assembly. These flow openings 20 are thus arranged substantially between the positions of the fuel rods 4.

Figure 5A:
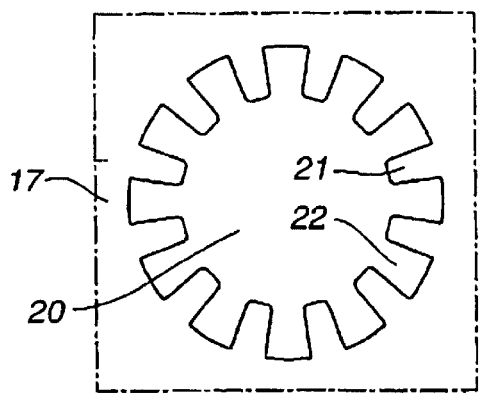
FIG. 5a shows in a view from above a flow opening in a top tie plate where flow tongues are arranged in the flow opening.

FIG. 5a shows a flow opening 20 in a top tie plate 17. In the flow opening 20, flow tongues 21 are arranged. Between the flow tongues, spaces 22 are arranged.

Figure 5B:
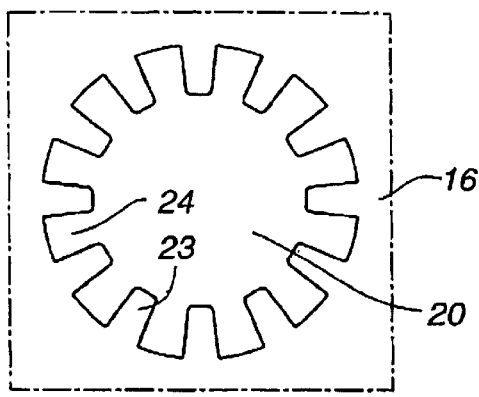
FIG. 5b shows in a view from above a flow opening in a bottom tie plate where flow tongues are arranged in the flow opening.

FIG. 5b shows a flow opening 20 in a bottom tie plate 16. In the flow opening 20, flow tongues 23 are arranged. Between the flow tongues, spaces 24 are arranged.

Figure 5C:
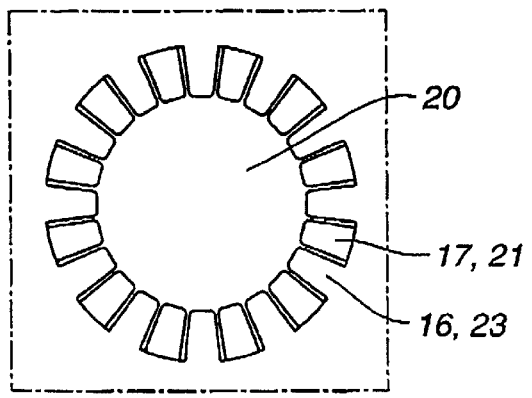
FIG. 5c shows in a view from above flow openings in a bottom tie plate and in a top tie plate, respectively, the bottom tie plate being arranged above a top tie plate such that flow tongues in the respective flow opening are arranged such that the flow tongues in the bottom tie plate are arranged across spaces between the flow tongues in the top tie plate.
Figure 5D:
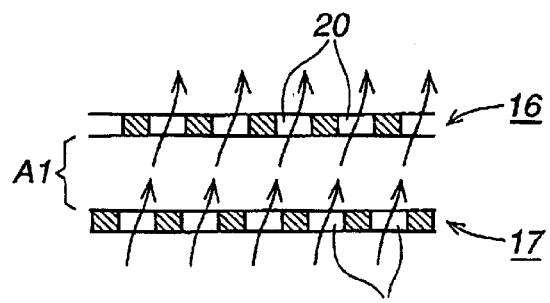
FIG. 5d shows in a view form above a plurality of flow openings in a bottom tie plate according to FIG. 5b, arranged at a certain distance from a top tie plate according to FIG. 5b, also provided with a plurality of flow openings.
Figure 5E:
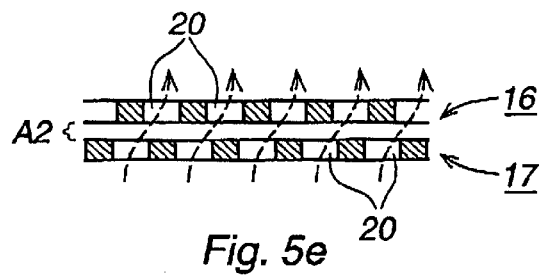
FIG. 5e shows a view from the side of a bottom tie plate arranged at a smaller distance from a top tie plate compared with FIG. 5d.

FIG. 5c shows the bottom tie plate 16 in FIG. 5b arranged above the top tie plate 17 in FIG. 5a. The flow tongues 23 in the bottom tie plate 16 are arranged above the spaces 22 in the top tie plate 17 and the flow tongues 21 in the top tie plate 17 are arranged below the spaces 24 in the bottom tie plate 16. In a new fuel assembly, the top tie plate 17 is arranged at a definite distance A1, of the order of size of a few millimeters, from the bottom tie plate 16 (see FIG. 5d). When, during operation of the reactor, the fuel rods 4 are extended, because of the radioactive irradiation, more than the control rod guide tubes 4a and the water channels 14, 14a, 14b, respectively, and when one of the top tie plate 17 or the bottom tie plate 16 is secured to the control rod guide tubes 4a and the water channels 14, 14a, 14b, respectively, whereas the other is freely movable around the guide tubes and water channels, the distance between the top tie plate 17 and the bottom tie plate 16 is reduced gradually during the service life of the fuel assembly (see A2 in FIG. 5e). In this way, burnup-dependent and automatic flow limitation, restriction, is obtained. The arrows in FIGS. 5d and 5e indicate the path of the coolant through the top tie plate 17 and the bottom tie plate 16.

Figure 6A:
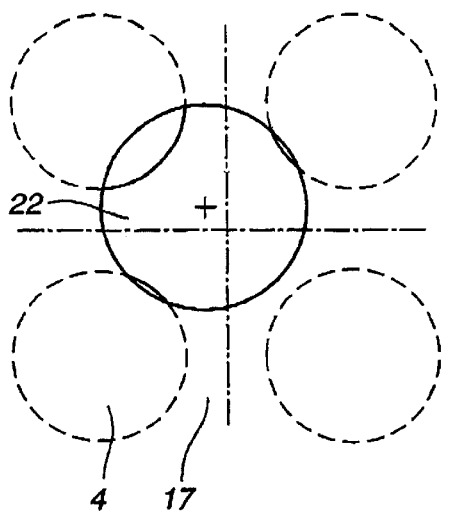
FIG. 6a shows in a view from above a flow opening in a top tie plate.
Figure 6B:
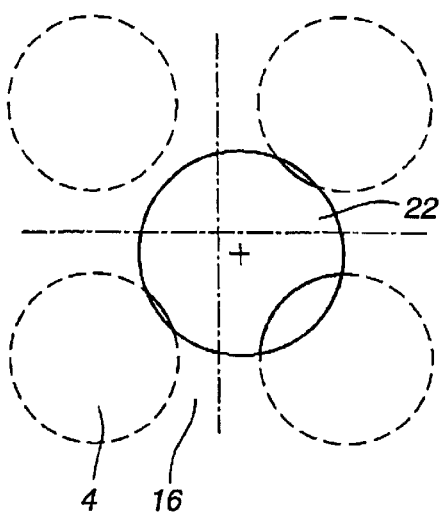
Figure 6C:
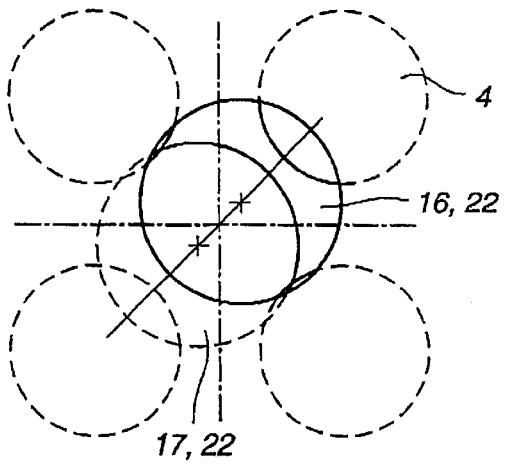
FIG. 6c shows in a view from above the flow openings in a bottom tie plate arranged above a top tie plate such that the center axes of the flow openings are arranged displaced in relation to each other.
Figure 6D:
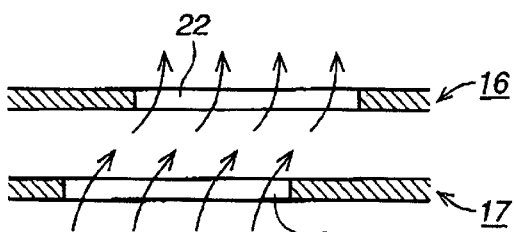
FIG. 6d shows in a view from above a plurality of flow openings in a bottom tie plate according to FIG. 6b, arranged at a certain distance from a top tie plate according to FIG. 6a, also provided with a plurality of flow openings.
Figure 6E:
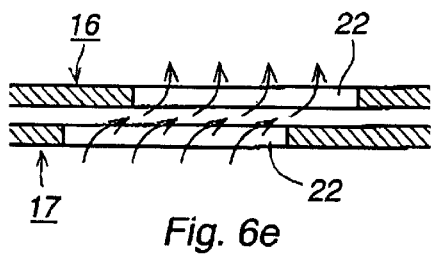
FIG. 6e shows a view of a bottom tie plate arranged at a smaller distance from a top tie plate compared with FIG. 6d.

FIGS. 6a–6c show an alternative form of burnup-dependent flow limitation where the flow openings 20 in the top tie plate 17 and in the bottom tie plate 16 are given eccentrically displaced center axes. FIGS. 6d–6e show how the coolant flow is gradually restricted during the service life of the fuel assembly in that the fuel rods 4 grow more in the axial direction than the control rod guide tubes 4a and the water channels 14, 14a, 14b, respectively.

Figure 7A:
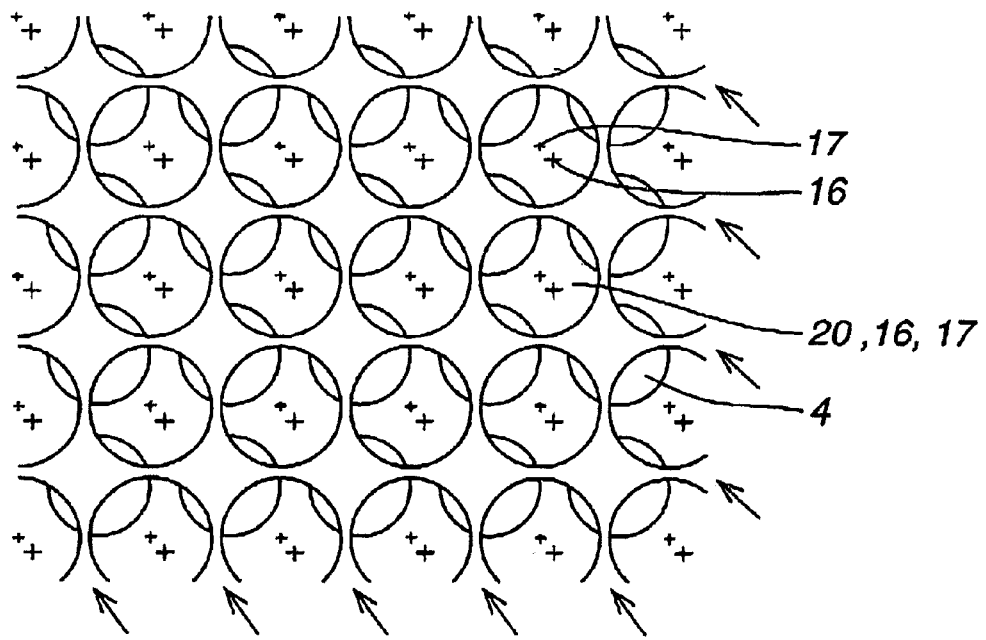
FIG. 7a shows in a view from above top and bottom tie plates according to FIGS. 6a and 6b arranged with the center axes of the flow openings displaced such that coolant is guided diagonally through a mixing cross section.

FIG. 7a shows an embodiment of top tie plates 17 and bottom tie plates 16 provided with flow openings 20 with center axes displaced in relation to each other. In FIG. 7a, the center axes are displaced in relation to each other in such a way that a diagonal flow is created by a mixing cross section in the fuel assembly which, for example, may consist of two adjacently located fuel assemblies or four adjacently located sub-assemblies.

Figure 7B:
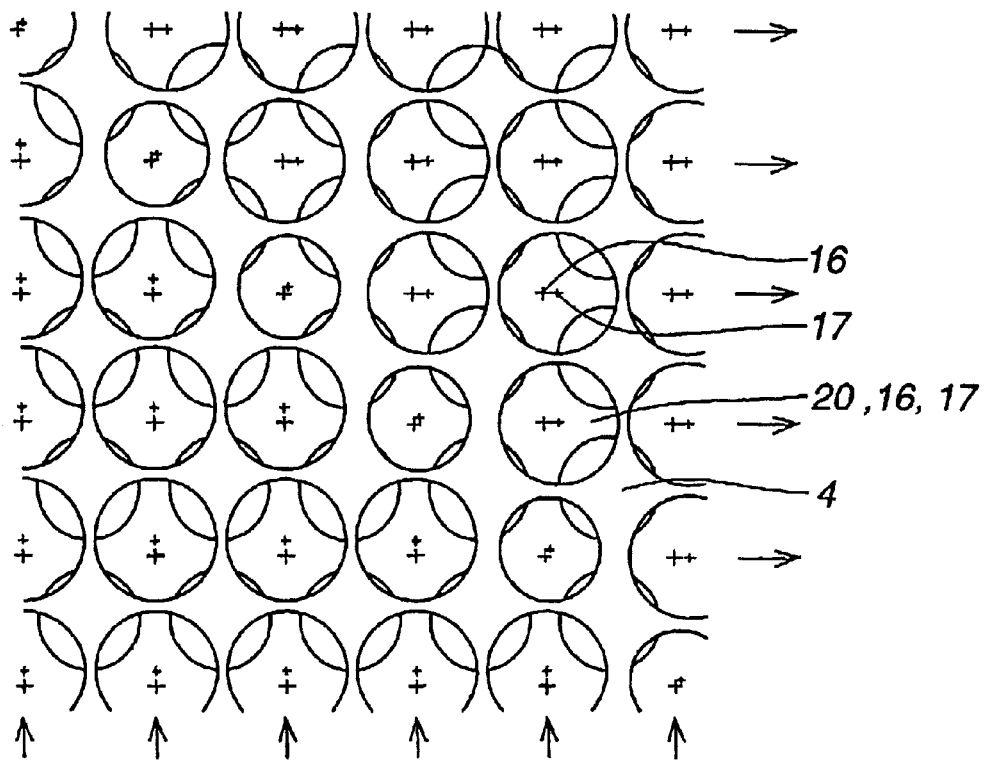
FIG. 7b shows in a view from above top and bottom tie plates according to FIGS. 6a and 6b arranged with the center axes of the flow openings displaced such that coolant is guided so as to be rotated substantially 90° in a mixing cross section.

FIG. 7b shows an alternative embodiment of the flow control in FIG. 7a. In FIG. 7b the center axes of the flow openings have been displaced such that, within the mixing cross section, the flow is deflected through substantially 90°.

What is claimed is:

1. A fuel assembly for a light-water nuclear reactor with a substantially square cross section, comprising a plurality of fuel units stacked one above the other, each fuel unit comprising a plurality of fuel rods extending between a top tie plate and a bottom tie plate and each fuel unit being attached to a support structure extending through the whole fuel assembly so that axial gaps are formed between facing top and bottom tie plates of adjacent fuel units, one of said facing top and bottom tie plates being permanently or detachably mounted to the support structure, and that other of said facing top and bottom tie plates being freely movable in relation to said support structure.

2. A fuel assembly according to claim 1, wherein the support structure consists of control rod guide tubes or water channels.

3. A fuel assembly according to claim 1, wherein at least one fuel unit comprises a spacer.

4. A fuel assembly according to claim 1, wherein at least one fuel unit comprises means for burnup-dependent flow resistance.

5. A fuel assembly according to claim 1, wherein said facing top and bottom tie plates are provided with flow openings with coinciding center axes, and wherein flow tongues are arranged in said flow openings to provide spaces between the flow tongues in the top tie plate that are overlapped by flow tongues in the bottom tie plate, said facing top and bottom tie plates being arranged so that a distance between the top tie plate and the bottom tie plate is adapted to decrease during operation of the reactor.

6. A fuel assembly according to claim 1, wherein said facing top and bottom tie plates are provided with flow openings with center axes displaced in relation to each other, and wherein said facing top and bottom tie plates are arranged so that a distance between the top tie plate and the bottom tie plate is adapted to decrease during operation of the reactor.

7. A fuel assembly according to claim 6, wherein said center axes are displaced so that the coolant is guided in a diagonal direction through a mixing cross section.

8. A fuel assembly according to claim 6, wherein said center axes are displaced so that the coolant is guided and deflected through an angle of substantially 90° through a mixing cross section.

* * * * *